United States Patent [19]

Unruh

[11] 4,253,331
[45] Mar. 3, 1981

[54] FORCE MEASURING DEVICE
[75] Inventor: Dennis R. Unruh, Wichita, Kans.
[73] Assignee: The Cessna Aircraft Company, Wichita, Kans.
[21] Appl. No.: 77,818
[22] Filed: Sep. 21, 1979
[51] Int. Cl.³ .................................................. G01L 1/04
[52] U.S. Cl. ..................................... 73/141 A; 172/7; 172/9
[58] Field of Search ................. 73/141 A, 141 R, 143; 172/7, 9, 10, 11, 12

[56] References Cited
U.S. PATENT DOCUMENTS

| | | |
|---|---|---|
| 2,520,923 | 9/1950 | Franzel et al. ..................... 73/141 A |
| 3,240,057 | 3/1966 | Ormond ............................. 73/141 A |
| 3,438,251 | 4/1969 | Kloss ................................. 73/141 A |
| 3,600,942 | 8/1971 | Brendel ............................. 73/141 A |
| 3,628,610 | 12/1971 | Morkoski ................................. 172/7 |

*Primary Examiner*—Donald O. Woodiel

[57] ABSTRACT

This lower link for a three-bar hitch provides a practical way to determine the tension force present in a lower link independent of any bending or other loadings. The link is formed of two bars which are bent out from each other to an intermediate point and then converge together forming a diamond-shaped opening between the bars and the distance between the intermediate points on the bars is measured by a length measuring device; the length being translatable into the tension force on the link.

5 Claims, 4 Drawing Figures

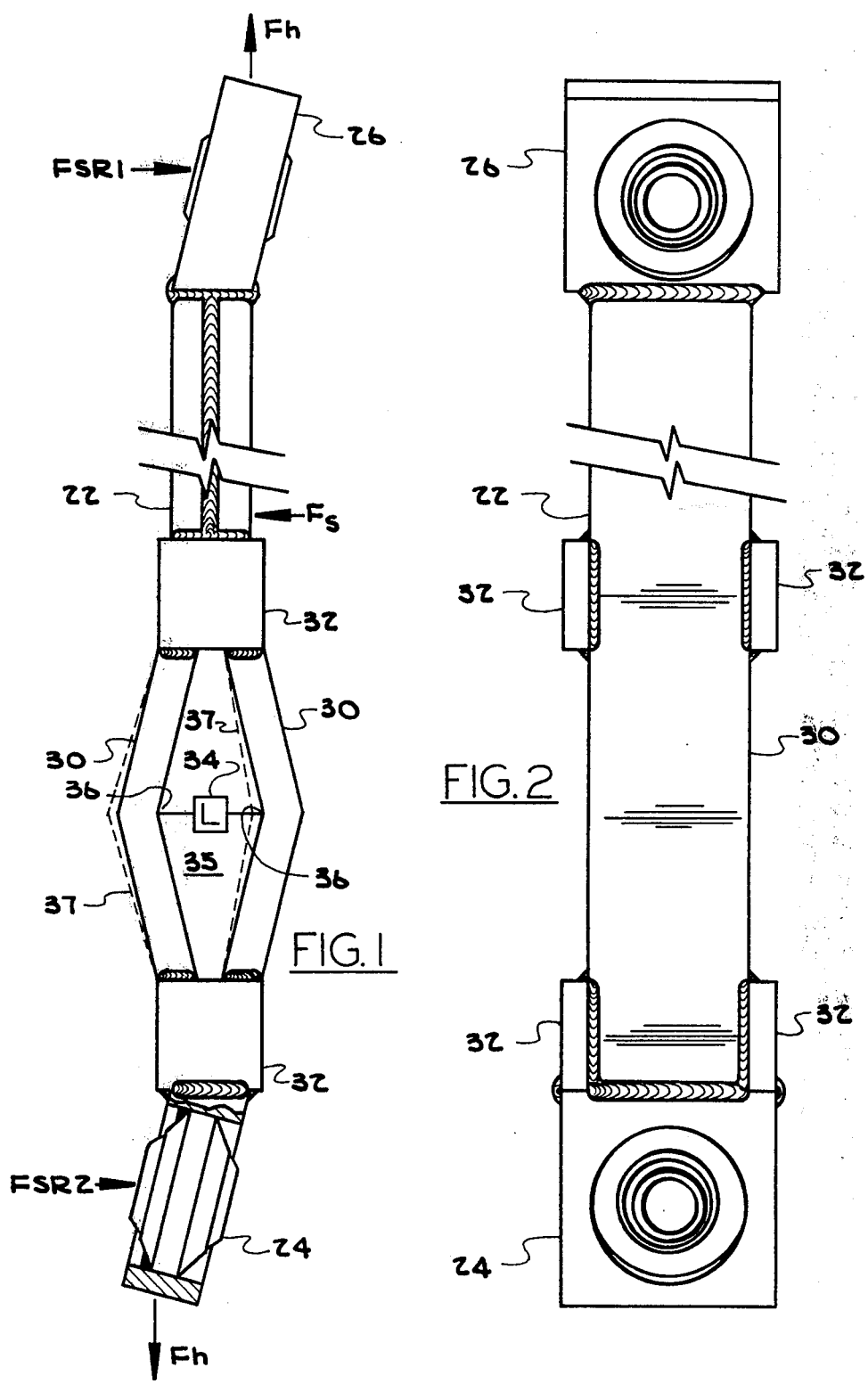

FORCE MEASURING DEVICE

BACKGROUND OF THE INVENTION

The present invention relates generally to agricultural machinery and more particularly to measuring the drawbar pull on a tractor.

Plow depth control, also referred to as draft control, on a three-point hitch tractor mount has been manually controlled in the past by the tractor operator. As the ground becomes more resistant to the plow, the tractor engine lugs down along with the tractor speed until either the engine stalls or the operator lifts the plow to a shallower depth so that the pulling resistance is decreased.

This can also be accomplished automatically wherein the drawbar pull is sensed and the plow is raised whenever the load begins to exceed the capacity of the tractor. When soft ground is again engaged, the plow is automatically lowered to a preset depth. This can be controlled in a practical manner by placing a measuring device built into the lower link of a tractor three-point hitch which determines the tension force in that lower link. A conventional three-point hitch consists of one upper link and two lower links connecting an agricultural or construction tractor to a plow implement being pulled, and ordinarily includes a lift linkage to set and hold the plow depth of the trailing plow implement.

DESCRIPTION OF THE PRIOR ART

U.S. Pat. No. 3,600,942 describes how the magnitude of force along a certain axis is generally isolated from all extraneous forces and measure; then describes an improved beam type of load cell. The additional space required over the measuring device of this invention makes it impractical for use on a lower link of a tractor three-point hitch.

U.S. Pat. No. 3,669,756 describes a measuring system that measures weight of materials placed in a container on a vehicle while the present invention's purpose is to measure the pulling force in a lower link of a three-point hitch while excluding the forces generated by bending and by weight.

SUMMARY OF THE INVENTION

This force measuring device for a lower link of a tractor three-point hitch comprises a pair of bent link bars connecting a link connection at one end of the link to a hitch connection at the other end. The bent link bars are so formed and assembled that they diverge from each other, and then return forming a diamond-shaped opening. The opening reaches a maximum lateral divergence at a point between the two end connections, but the bent link bars are adjacent to each other at the end connections. A length or distance measuring device is inserted in the opening between the pair of bars at their point of maximum divergence. The readings of this measuring device (length), which are related to the tension force in the lower link, are calibrated to read in tension force. When the drawbar pull increases the tension force in the lower link, the bent bars tend to straighten out and the distance between the lateral points in the diamond-shaped opening decreases. The bars are proportioned so that they remain elastically yieldable in the range of forces to be encountered. Incidental lateral bending loads do not affect the measurement because the diamond-shaped area moves laterally leaving the distance between the lateral points of the diamond basically unchanged.

The principal object of the present invention is to provide a load cell link which senses tensile loads while ignoring all side loads.

Another object of the present invention is to provide a simplified load cell link usable on a farm tractor which is sufficiently strong not to exceed its elastic limit while remaining sufficiently sensitive to measure a wide range of tensile loads.

BRIEF DESCRIPTION OF THE DRAWINGS

FIG. 1 is a plan view, partially in section, of a lower link embodying the invention;

FIG. 2 is a side view of the lower link shown in FIG. 1;

DESCRIPTION OF THE PREFERRED EMBODIMENT

Figure 3:
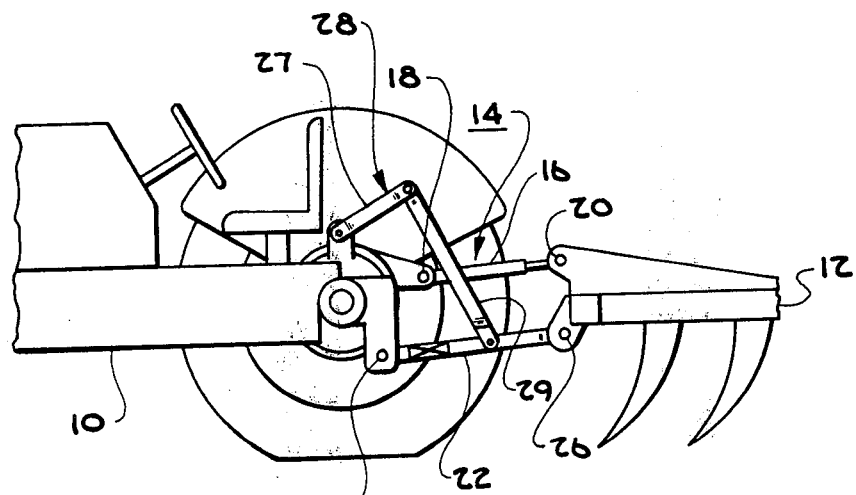
FIG. 3 is a side view of a tractor with a three-point hitch connecting it to an implement and showing the location of a lower link.
Figure 4:
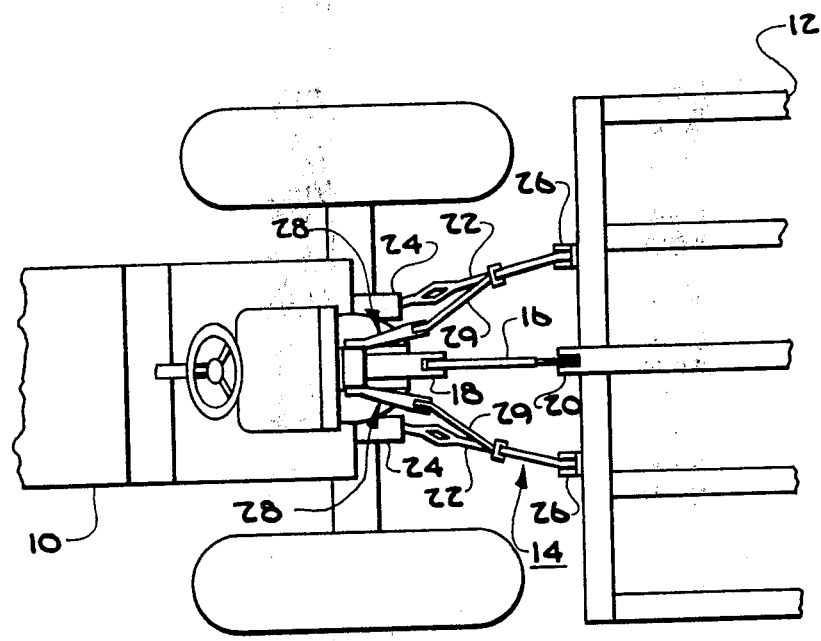
FIG. 4 is a plan view of the equipment in FIG. 3, and showing the location of both lower links.

Referring first to FIGS. 3 and 4, a tractor 10 is shown with a conventional three-point hitch linkage 14 connecting to an implement 12. The three-point linkage 14 comprises: an upper link 16 connected to the tractor 10 with an upper link connection 18 and to the implement 12 with an upper hitch connection 20; and a pair of lower links 22 connected to the tractor 10 with a pair of lower link connections 24 and to the implement 12 with a pair of lower hitch connections 26. The implement 12 is raised or lowered by means of a lift linkage 28 which includes links 27 and 29. Link 29 is pivotally connected to lower link 22 approximate its midpoint while link 27 is connected to a rotatable shaft 31. The lift linkage 28 is elevated or lowered by any conventional means (not shown in the drawing) such as a hydraulic cylinder.

Referring now to FIGS. 1 and 2, the lower link 22 is shown in more detail. The lower link connection 24 provides a pivoting joint for connecting to the tractor 10 and the lower hitch connection 26 for connecting to the implement 12. A pair of bent link bars 30 provide a draft connection between the lower link connection 24 and the lower hitch connection 26. The bars 30, while generally parallel, are bent outward at a point so that the space between the bars 30, as viewed in FIG. 1, forms a diamond-shaped opening 35. The lateral points 36 of this opening will move minutely toward each other when the pulling force Fh is applied to each end of the lower link 22. The length measuring device 34, symbolically shown, measures this change in distance which can be translated into tension force Fh. A pair of gusset plates 32 is attached to the bent link bars 30 at each longitudinal end of the opening 35. The bent link bars 30 are proportioned in strength to be elastically yieldable at the length measuring device 34. One lower link 22 that was tested satisfactorily, had the bent link bars 30 made of three-fourths inch by three inch steel bars approximately two inches apart at the lateral points 36. The length between end connections was 39 inches. Several methods can be used to measure length between lateral points 36. For example, the length measuring device 34 could be of an optic device, a hydraulic device or even a strain gauge type device.

The effect of a lateral bending load Fs, such as that caused by the lift linkage 28, is symbolically illustrated in dotted lines 37 in FIG. 1. The load Fs is transferred to a pair of reactions Fsr1 and Fsr2, and the diamond will deflect to a position indicated by lines 37. The lateral points 36 of the diamond will both move in the direction of the force Fs leaving the distance between the lateral points 36 unchanged.

Having described the invention with sufficient clarity to enable those familiar with the art to construct and use it, I claim:

1. A force measuring device to determine the tension force exerted on a lower link of a tractor three-point hitch comprising:

a lower link having on one end a link connection and on the opposite end a hitch connection;

a draft means forming a portion of the lower link intermediate the ends comprising a pair of bent link bars which diverge from a first juncture point and then converge from an intermediate point to a second juncture point to form a diamond-shaped opening between the bar; and a length measuring means positioned in the opening for measuring the distance between the pair of bent bars at the intermediate point which distance relates to and is translatable into the tension force exerted on the lower link.

2. A force measuring device as recited in claim 1, further comprising a pair of gusset plates welded to the pair of bent bars at their juncture points.

3. A force measuring device as recited in claim 1, in which the length measuring means is optically operated.

4. A force measuring device as recited in claim 1, wherein the lower link includes an additional lift connection point intermediate the link and hitch connection points.

5. A force measuring device as recited in claim 1, wherein the link connection and hitch connections are offset from the lengitudinal axis of the link.

* * * * *